US011911991B2

(12) United States Patent
Huang et al.

(10) Patent No.: US 11,911,991 B2
(45) **Date of Patent: *Feb. 27, 2024**

(54) BOX ERECTING APPARATUS AND METHOD

(71) Applicant: Taiwan Semiconductor Manufacturing Co., Ltd., Hsinchu (TW)

(72) Inventors: Szu-Chen Huang, Hsinchu (TW); Fu-Hsien Li, Hsinchu (TW); Mao-Jung Chiu, Hsinchu (TW); Mao-Shun Lien, Hsinchu (TW); Po-Hsien Chiu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,640

(22) Filed: Jul. 21, 2022

(65) Prior Publication Data

US 2022/0355561 A1 Nov. 10, 2022

Related U.S. Application Data

(63) Continuation of application No. 16/943,865, filed on Jul. 30, 2020, now Pat. No. 11,426,965.

(51) Int. Cl.

| | |
|---|---|
| ***B31B 50/00*** | (2017.01) |
| ***B31B 50/02*** | (2017.01) |
| ***B31B 50/07*** | (2017.01) |
| ***B31B 50/52*** | (2017.01) |
| *B31B 100/00* | (2017.01) |

(52) U.S. Cl.

CPC .......... *B31B 50/005* (2017.08); *B31B 50/006* (2017.08); *B31B 50/022* (2017.08); *B31B 50/07* (2017.08); *B31B 50/52* (2017.08); *B31B 2100/00* (2017.08)

(58) Field of Classification Search

CPC ..... B31B 50/005; B31B 50/07; B31B 50/006; B31B 50/022; B31B 50/52; B31B 2100/00

See application file for complete search history.

(56) References Cited

U.S. PATENT DOCUMENTS 4,071,896 A * 1/1978 Boyer, III ............ G05B 19/188 700/127
4,579,551 A 4/1986 Ulrich et al.
(Continued)

FOREIGN PATENT DOCUMENTS

CN 207089784 U 3/2018
CN 108495746 A 9/2018
(Continued)

*Primary Examiner* — Thomas M Wittenschlaeger
(74) *Attorney, Agent, or Firm* — Seed IP Law Group LLP

(57) ABSTRACT

An apparatus and method for expanding a box blank into a box, the apparatus comprising an arm assembly, a controller, a camera and a box blank conveyor. The arm assembly includes a folding arm having a position in a first direction and a rotational angle controlled by the controller based on a position of a feature of the box blank in the field of view of the camera. The camera captures images of the box blank which are used to position the arm assembly and to evaluate the need to reject a box blank.

20 Claims, 13 Drawing Sheets

(56) References Cited

U.S. PATENT DOCUMENTS

| | | | | |
|---|---|---|---|---|
| 5,061,231 | A * | 10/1991 | Dietrich | B65B 43/265 493/317 |
| 5,207,630 | A * | 5/1993 | Decker | B31B 50/80 493/317 |
| 5,536,231 | A * | 7/1996 | Nilsson | B31B 50/00 493/315 |
| 6,106,450 | A * | 8/2000 | Brittain | B31B 50/78 493/171 |
| 6,319,183 | B1 * | 11/2001 | Ballos, III | B31B 50/006 493/309 |
| 6,764,436 | B1 * | 7/2004 | Mazurek | B31B 50/804 493/122 |
| 6,913,568 | B2 * | 7/2005 | Frank | B31B 50/802 493/309 |
| 6,915,622 | B2 * | 7/2005 | Spatafora | B65B 43/305 53/381.1 |
| 7,163,502 | B2 * | 1/2007 | Fulkerson | B31B 50/00 493/122 |
| 7,243,481 | B2 | 7/2007 | Draghetti | |
| 7,316,642 | B2 * | 1/2008 | Martelli | B65B 43/305 493/309 |
| 7,404,788 | B2 * | 7/2008 | Monti | B65H 3/085 493/309 |
| 7,509,790 | B1 * | 3/2009 | Filep | B31B 50/52 53/376.4 |
| 7,708,678 | B2 | 5/2010 | Monti | |
| 7,788,881 | B2 * | 9/2010 | Johnson | B65B 43/265 493/309 |
| 8,033,975 | B2 | 10/2011 | Wiklund | |
| 8,075,467 | B2 | 12/2011 | Monti et al. | |
| 8,246,527 | B2 * | 8/2012 | Wilkinson | B31B 50/262 493/70 |
| 8,343,024 | B1 * | 1/2013 | Costanzo, Jr. | B65D 5/2047 493/185 |
| 8,602,956 | B2 * | 12/2013 | Monti | B65B 43/265 493/309 |
| 10,137,656 | B2 * | 11/2018 | Lundgren | B31B 50/786 |
| 11,136,153 | B2 * | 10/2021 | Langen | B65G 57/22 |
| 11,426,965 | B2 * | 8/2022 | Huang | B31B 50/006 |
| 2001/0008062 | A1 | 7/2001 | Craig et al. | |
| 2006/0117714 | A1 * | 6/2006 | Draghetti | B65B 43/265 53/566 |
| 2007/0072755 | A1 * | 3/2007 | Monti | B31B 50/804 493/125 |
| 2009/0247380 | A1 * | 10/2009 | Monti | B65B 43/305 493/315 |
| 2009/0264271 | A1 * | 10/2009 | Wiklund | B31B 50/36 493/441 |
| 2019/0061982 | A1 | 2/2019 | Iwasa et al. | |

FOREIGN PATENT DOCUMENTS

| | | | |
|---|---|---|---|
| CN | 109552704 | A | 4/2019 |
| CN | 209667485 | U | 11/2019 |
| FR | 2478576 | A1 | 9/1981 |

* cited by examiner

BOX ERECTING APPARATUS AND METHOD

BACKGROUND

Shipping boxes keep customer order items together as well as protect the contents of the box. Corrugated cardboard boxes are especially useful because flat box blanks are convenient to ship to a manufacturing or distribution business. At the business site the flat box blank may be expanded, or erected, by folding the box blank at score lines, or creases, to form a box. Panels of the box blank are separated by score lines. Once expanded into a box, product may be inserted into the box for storage and/or shipping. Box erecting, or expanding, machines may automate the folding of a flat box blank for use in high volume production or distribution situations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
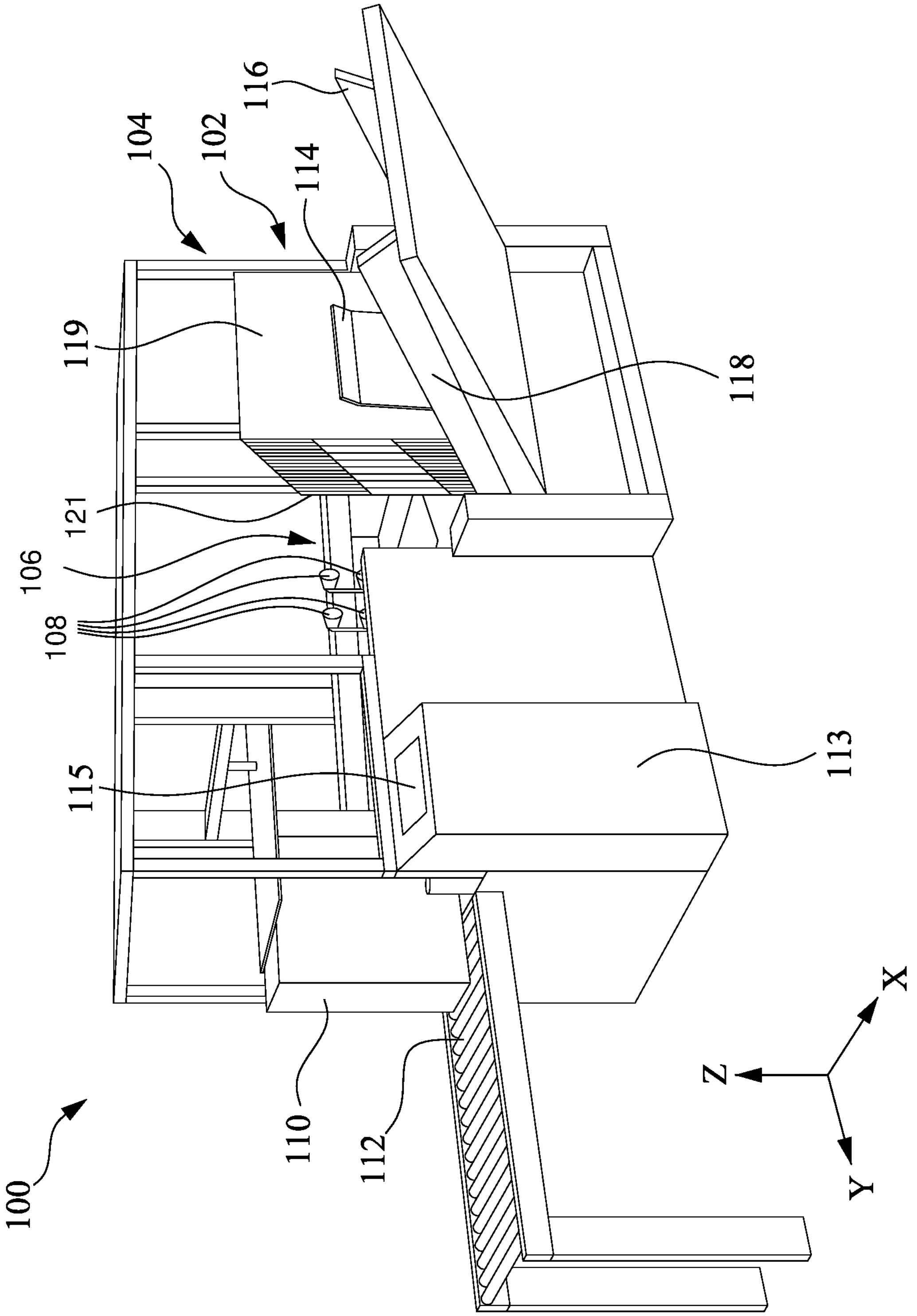
FIG. 1 is a perspective view of a box erecting machine, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Box erecting, or expanding, machines automatically fold box blanks at score lines between panels of a cardboard box. These machines are suitable for manufacturing or distribution centers that ship large volumes of product in cardboard boxes. Automatic functions such as adjusting to a variety of box sizes can reduce injury to machine operators and increase productivity.

FIG. 1 shows a box erecting machine 100 in perspective view, in accordance with an embodiment of the present disclosure. A set of three directional axes X, Y, and Z are shown to facilitate description of FIGS. 1-7C. The box erecting machine 100 includes a box feed hopper, or box blank cartridge 102 which holds multiple flat boxes, or box blanks 104, and feeds the box blanks 104 to an expanding apparatus 106 one at a time. A first box blank 121 is the one of the box blanks 104 staged in the box blank cartridge 102 and is closest to the expanding apparatus 106. The first box blank 121 is positioned to be pulled into the expanding apparatus 106 where it will be expanded or opened up to form a usable box. In accordance with the illustrated embodiment, first box blank 121 is pulled into expanding apparatus 106 using vacuum suction cups 108. As a box blank 104 is individually pulled into the expanding apparatus 106, forces are applied to panels and flaps of the box blanks 104 such that the box blanks 104 bend at scores lines and the box blanks 104 expand to form a container, or box 110. The box 110 exits the box erecting machine 100 on an exit conveyor 112. Operation of the box erecting machine 100 is controlled by a machine controller 113 having an operator interface 115.

The box blank cartridge 102 includes a cartridge follower 114, a right box blank guide 116 and a left box blank guide 118. The right and left box blank guides 116 and 118 keep the box blanks 104 aligned with the expander apparatus in the box blank cartridge 102. In operation, an operator places box blanks 104 into the box blank cartridge 102 with the box blanks 104 upright between the right box blank guide 116 and the left box blank guide 118. Panels of the box blanks 104 face either the expanding apparatus 106 or the cartridge follower 114. The cartridge follower 114 moves to contact panels of the last box blank 119 in the box blank cartridge 102. The box blank cartridge 102 is sloped downward, toward the expanding apparatus 106, allowing gravity to assist movement of the box blanks 104 toward the expanding apparatus 106. The cartridge follower 114 maintains contact with the last box blank 119 in the box blank cartridge 102, keeping the box blanks 104 upright. Various sizes of box blanks 104 may be accommodated by the box blank cartridge 102 by moving the right box blank guide 116 toward, or away from, the left box blank guide 118 to accommodate a width of the box blanks 104.

Figure 2:
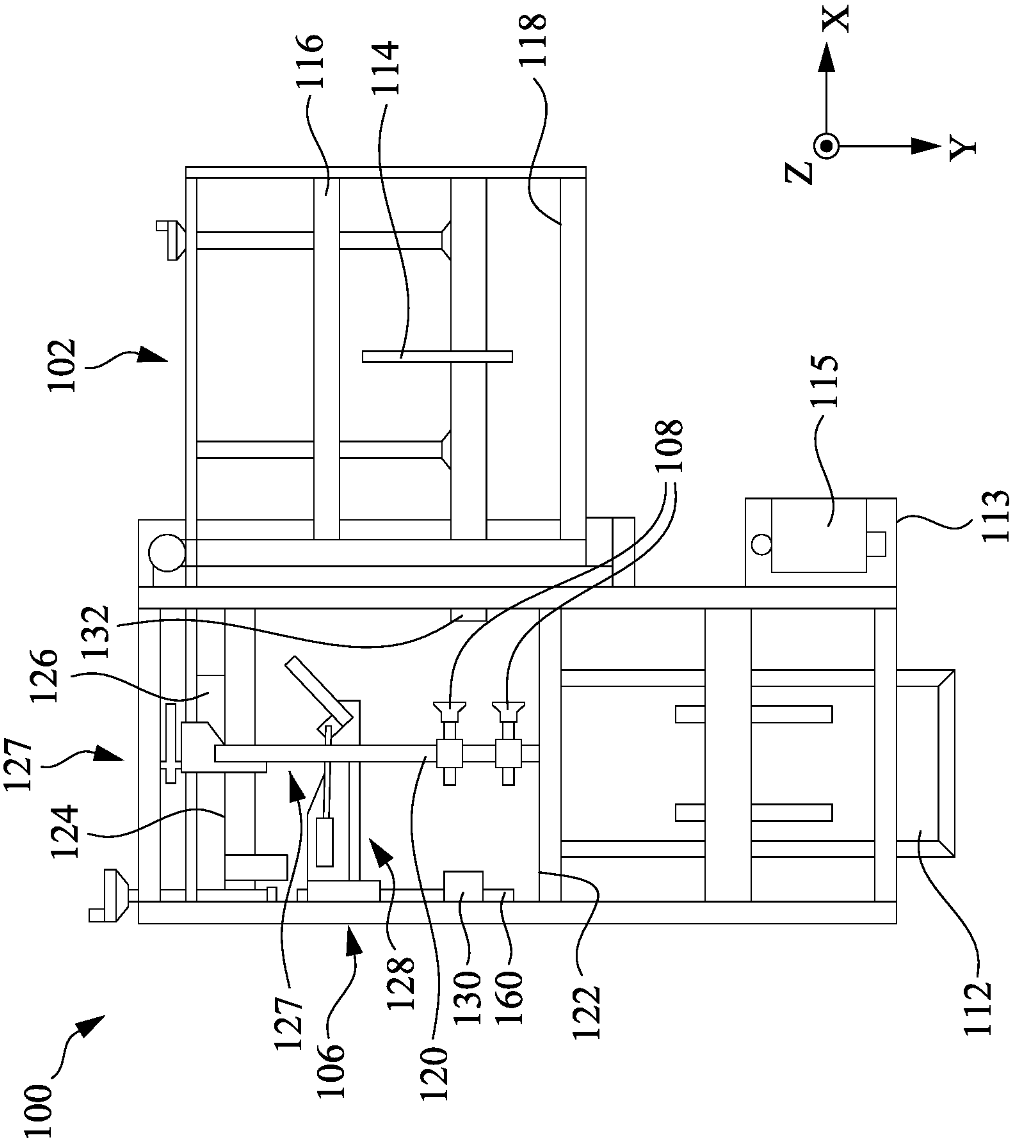
FIG. 2 is a top view of the box erecting machine of FIG. 1, in accordance with some embodiments.

FIG. 2 is a top view of the box erecting machine 100. The box blanks 104 and the box 110 (see FIG. 1) are not shown. The box erecting machine 100 includes a box blank conveyor 127 for moving the first box blank 121 into the expanding apparatus 106. The box blank conveyor 127 includes vacuum suction cups 108 coupled to a gantry 120 which moves along gantry rails 122 and 124. Movement of gantry 120 along gantry rails 122 and 124 causes the vacuum suction cups 108 to move parallel to the X axis. A position of the vacuum suction cups 108 is determined by a gantry motor 126 coupled between the gantry 120 and the gantry rail 124. The gantry motor 126 is controlled by the machine controller 113. The expanding apparatus 106 also includes an arm assembly 128 and an imaging device, such as a camera 130. The camera 130 is pointed toward the box blank cartridge 102, so that the imaging portion of the camera can capture an image of a box blank about to enter the expanding apparatus 106, also known as the next box blank. The expanding apparatus 106 may also have a gate latch 132 located at an edge of the expanding apparatus 106 adjoining the box blank cartridge 102. The gate latch 132, which may have a solenoid actuator, may be positioned to prevent the box blanks 104 from moving from the box blank cartridge 102 to the expanding apparatus 106 and is controlled by the machine controller 113.

Figure 3:
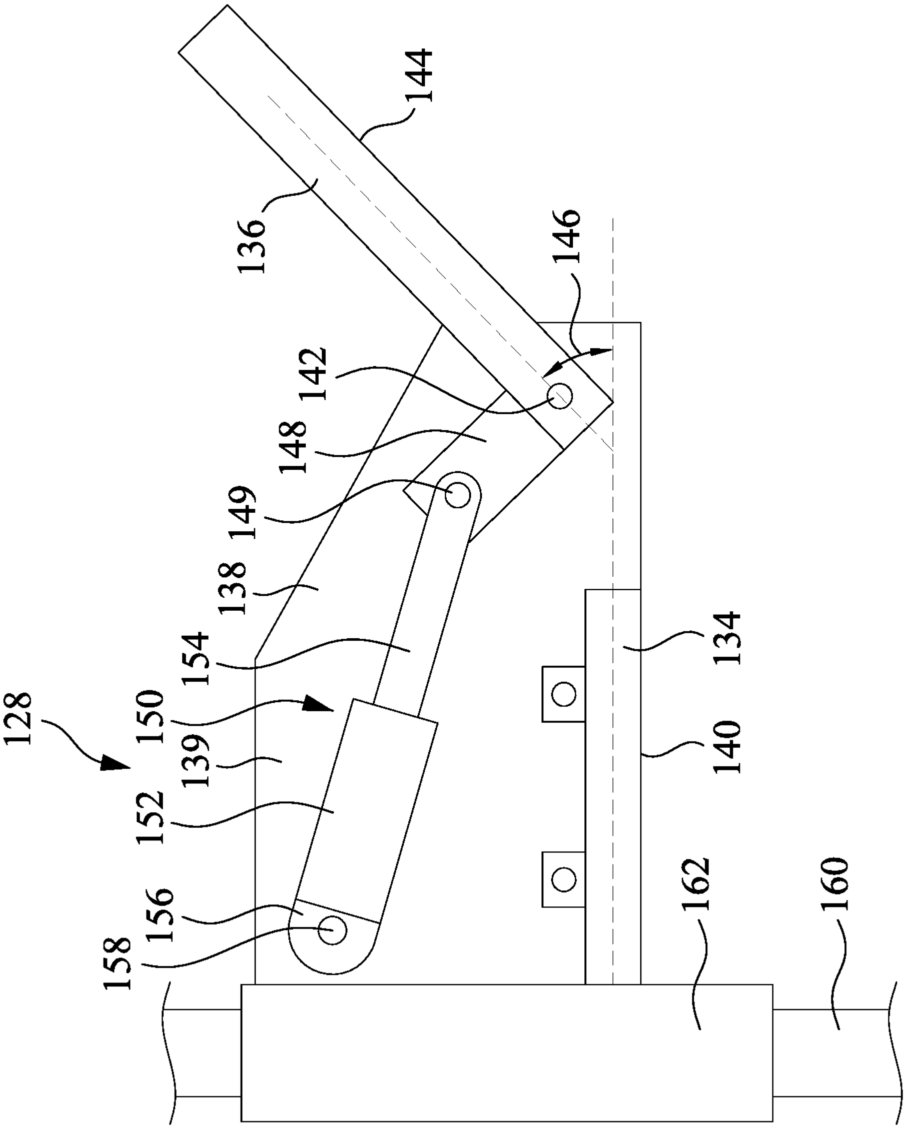
FIG. 3 is a top view of an arm assembly, in accordance with some embodiments.

FIG. 3 is a top view of an arm assembly 128 in accordance with an embodiment of the present disclosure. Arm assembly 128 includes a push arm 134 and a folding arm 136 coupled to a base 138. The base 138 has a surface 139 to which components of the arm assembly 128 are coupled. In the illustrated embodiment, the push arm 134 is rigidly coupled to the surface 139 of the base 138. A side or face 140 of the push arm 134 faces the exit conveyor 112, along the Y axis. The folding arm 136 is coupled to the base 138 by a folding arm pivot joint or a folding arm rotation joint 142 allowing rotation of the folding arm 136 parallel to an X-Y plane (horizontal plane) and around the Z-axis (vertical axis) in FIG. 3. A side or face 144 of the folding arm 136 faces the box blank cartridge 102 at a folding arm angle 146, the folding arm angle being an angle between the push arm 134 and the folding arm 136. The folding arm angle 146 is determined during operation based on a width of the box blank being expanded, as will be explained later. A drive extension 148 is coupled to the folding arm 136 at or near an end of the folding arm 136 where the folding arm rotation joint 142, is located. For example, the combination of drive extension 148 and folding arm 136, as shown in FIG. 3, forms an "L" shape structure. The arm assembly 128 also includes an actuator 150, for example, a linear pneumatic actuator is shown having a body or cylinder 152 and a piston arm, actuator arm or drive arm 154. The cylinder 152 is coupled to the base 138 of the arm assembly 128, using a cylinder tab 156 coupled to the cylinder 152 and a cylinder rotation joint 158 which is secured to the base 138. In this manner, the cylinder 152 has the freedom to rotate parallel to the X-Y plane as the drive arm 154 extends and retracts. In other embodiments, cylinder 152 can be rotatably secured to arm assembly positioner or 162. An end of the drive arm 154 is coupled to the drive extension 148 using a pivot point, an rotary joint, or an extension rotation joint 149, allowing the drive arm 154 and the folding arm 136 to rotate parallel to the X-Y plane. Extension and retraction of the linear actuator 150 is controlled by the machine controller 113.

Actuator 150 is not limited to a linear actuator. Other examples include a rotation actuator including an electric stepper motor having a rotor coupled to the folding arm and a body or stator coupled to the surface 139 of the base 138, the rotor acting as the folding arm rotation joint 142. Another example includes a sheave or pulley coupled to the folding arm centered on the rotation joint 142 and a motor having a stator coupled to the surface 139 of the base 138 and a rotor shaft of the motor coupled to another sheave or pulley, the pulleys coupled together with a belt.

The base 138 of the arm assembly 128 is also coupled to an arm linear track 160. The arm linear track 160 is parallel to the Y axis. An arm assembly positioner 162 is coupled between the base 138 and the arm linear track 160.

Examples of an arm assembly positioner 162 may include a linear ball bearing slider mounted to base 138. A belt running along the arm linear track 160 may be coupled between the linear ball bearing slider and an arm assembly position motor. The arm assembly position motor is electrically coupled to the machine controller 113. During operation, the machine controller 113 positions the arm assembly 128 along the arm linear track 160. In another embodiment, the arm assembly positioner 162 may include a motor coupled to the arm linear track to position the arm assembly 128 along the arm linear track 160.

Figure 4:
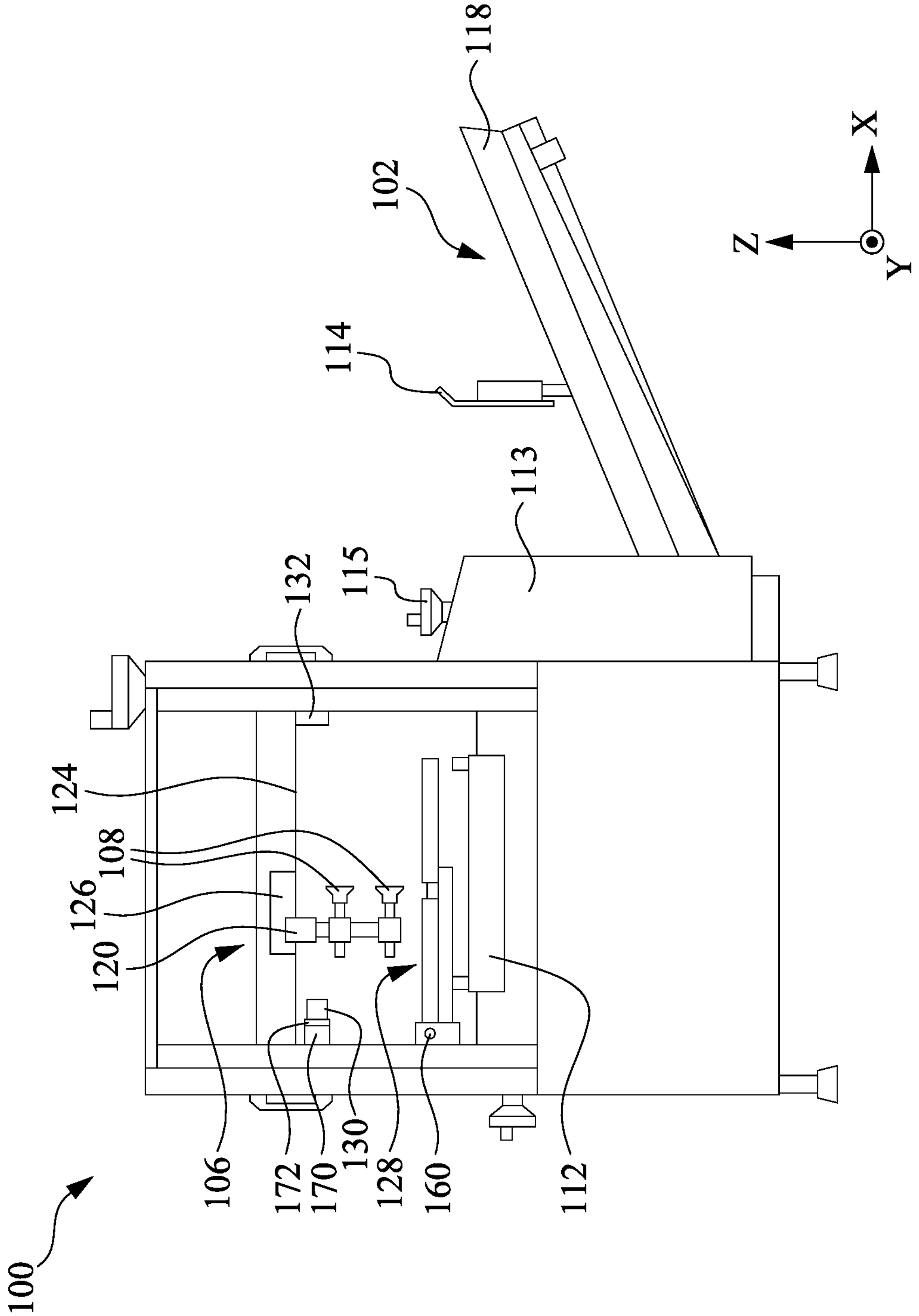
FIG. 4 is a side view of the box erecting machine of FIG. 1, in accordance with some embodiments.

A side view of the box erecting machine 100 is shown in FIG. 4. The vacuum suction cups 108 are coupled to the gantry 120 above, which is capable of moving parallel to the X axis. The arm assembly 128 is located at a height in the Z direction, at a position, or level, which does not interfere with movement of the arm assembly 128 along the arm linear track 160. The camera 130 is mounted at a position that provides a camera field of view including a score line of a first box blank 121 in the box blank cartridge 102.

Alternatively, the camera 130 may be adjustably mounted on a camera linear track 170 such that an operator may move the camera 130 horizontally, vertically, diagonally or other direction as indicated by the operator interface 115 to view the first box blank 121. In addition, the camera 130 is coupled to the camera linear track 170 parallel to the Y axis having a position of the camera 130 determined by a camera servo motor 172 controlled by the machine controller 113. The camera 130, in operation, views the score line between a first panel and a second panel of the first box blank 121. Other distinguishing marks on the box may be used in the camera field of view besides a score line, such as a line or cross hairs printed on the first box blank 121. The camera 130 is electronically coupled to the machine controller 113 such that an image or series of images may be transferred from the camera 130 to the machine controller 113.

Figure 5A:
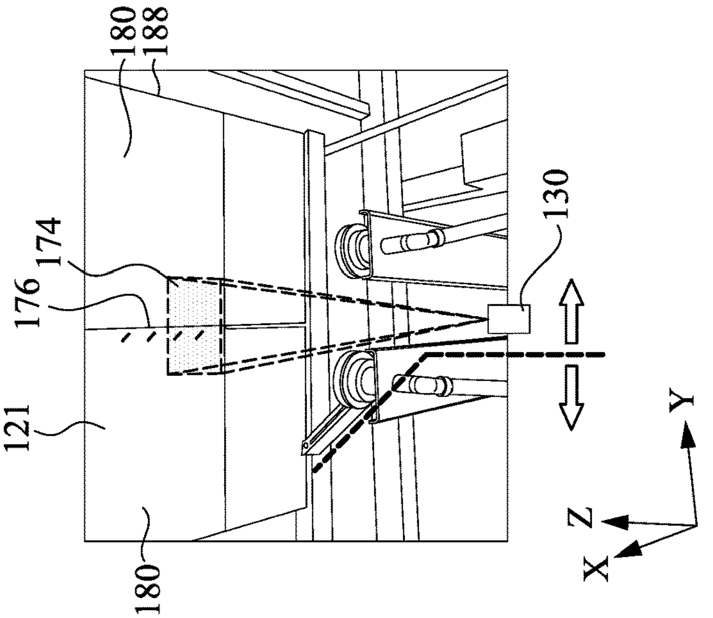
FIG. 5A is a perspective view of an expanding apparatus of a box erecting machine of FIG. 1, showing a field of view of a CCD camera, in accordance with some embodiments.

FIG. 5A is a perspective view of portion of the expanding apparatus 106 of FIG. 1 looking toward the box blank cartridge 102. The perspective view is from behind and above camera 130. In the illustrated embodiment, the camera 130 is positioned below the vacuum suction cups 108 facing toward the first box blank 121 in the box blank cartridge 102. In the illustrated embodiment, camera 130 has a field of view 174 that includes the score line 176 of the first box blank 121 between the two panels 178 and 180 of the first box blank 121. The first box blank 121 is being held in position by the gate latch 132 (see FIG. 5A), prior to the vacuum suction cups 108 moving toward the first box blank 121 to pull the first box blank 121 into the expanding apparatus 106. Examples of camera 130 which are useful in accordance with the present embodiment include video cameras, CCD cameras, CMOS cameras, and machine vision cameras having an on-board processor. The camera is electronically coupled to the machine controller 113 and may communicate an image of the camera's field of view to the machine controller 113 for processing. Alternatively, the camera 130 may process the image and communicate alternate information such as a distance and a direction to the machine controller 113. Machine controller can control the operation of the camera, including such features as zoom, focus and exposure.

Figure 5B:
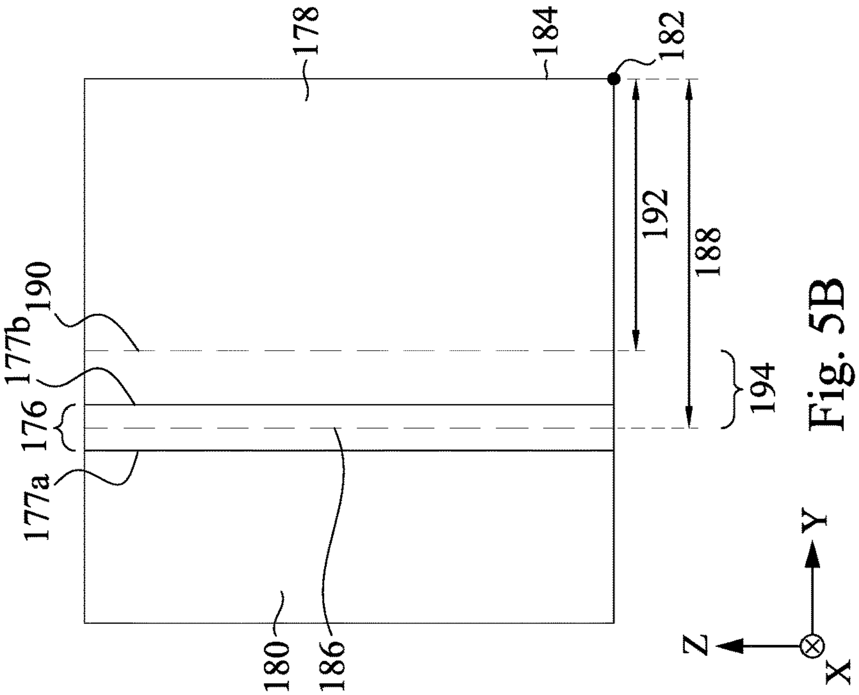
FIG. 5B is a view of a flat box blank seen by the CCD camera prior to box erection, in accordance with some embodiments.

FIG. 5B is an example of the field of view 174 of FIG. 5A. The field of view 174 includes a score line 176 preformed between panels 178 and 180 of the first box blank 121 (see FIG. 5A). A corner of the field of view 174, such as the lower right corner, may serve as a datum or reference point 182. The machine controller 113 may be programmed to recognize the score line 176, determine an actual position of the score line 186 and calculate an actual score line distance 188 from the reference point 182. Alternatively, a reference line 184 may be used to determine a plurality of distances orthogonally from the reference line 184 to the score line 176. Because the score line 176 may have a non-zero width, the actual position of the score line 186 may, for example, be an average position of the score line 176. Other means of determining the actual position of the score line 186 may be used including, for example, a position of one of score line edges 177*a* or 177*b*, or a weighted average of the positions of score line edges 177*a* and 177*b*. Because of variations in box blanks caused by, for instance, manufacturers, material or manufacturing location, the determination of the actual score position, may be found empirically.

The actual position of the score line 186 may differ from an expected position of the score line 190. An expected score line distance 192 may be determined as a difference in position between the reference point 182 and the expected position of the score line 190. A score line offset 194 may be determined by subtracting the actual score line distance 188 from an expected score line distance 192. The actual position of the score line 186 may be used, in operation, to position the arm assembly 128 such that the side 140 of the push arm 134 is, for example, aligned with the score line 176 of the first box blank 121. Alternate positions of the push arm 134 may be used other than alignment with the score line 176, as is empirically determined to be advantageous in expanding the box blank, for example, a small distance behind the score line toward the second panel.

The actual score line distance 188 may be compared to a set of known score line distances to determine box blank attributes such as a size of the box blank, misalignment of the first box blank 121 or a suitability or fitness of the box blank for expansion. Similarly, the score line offset 194 may be used to determine misalignment of the box blank or the suitability of the box blank for expansion.

To set the field of view 174, adjustment of a position of camera 130 may be performed by an operator to match a particular box blank type or size. Alternatively, camera 130 position may be determined automatically along the camera linear track 170 using the camera servo motor 172 controlled by the machine controller 113 once a box type has been selected using the operator interface 115. Other camera 130 positioning schemes may also be used such as a dual axis positioning system controlled by the machine controller 113 that positions the camera 130 in a Y-Z plane to obtain a suitable field of view 174.

Figure 5C:
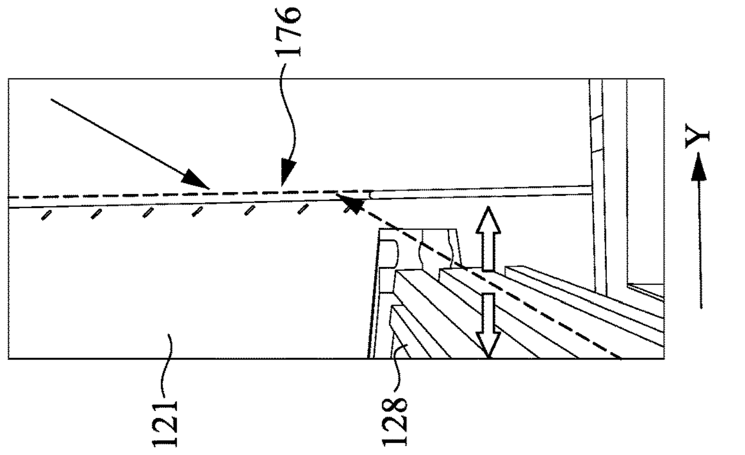
FIG. 5C is a view of a folding arm of a box erecting machine of FIG. 1, in accordance with some embodiments.

An advantage of using the camera 130 to determine the distance of the score line 176 from the reference point 182 includes an ability to position the arm assembly 128 to facilitate folding of the first box blank 121 into an expanded box 110 (see FIG. 1). As shown in FIG. 5C, the arm assembly 128 may be moved along a Y-axis such that the push arm 134 is positioned to accommodate the expanded box, avoiding blemishing the box and facilitating proper expansion of the box. For example, the first box blank 121 may be dented during expansion if the push arm 134 is advanced in the direction of the exit conveyor 112 past the score line. Alternatively, the first box blank 121 may not fully expand if the arm assembly 128 is too far away from the score line in a direction opposite the exit conveyor 112 (negative Y direction).

Figure 6B:
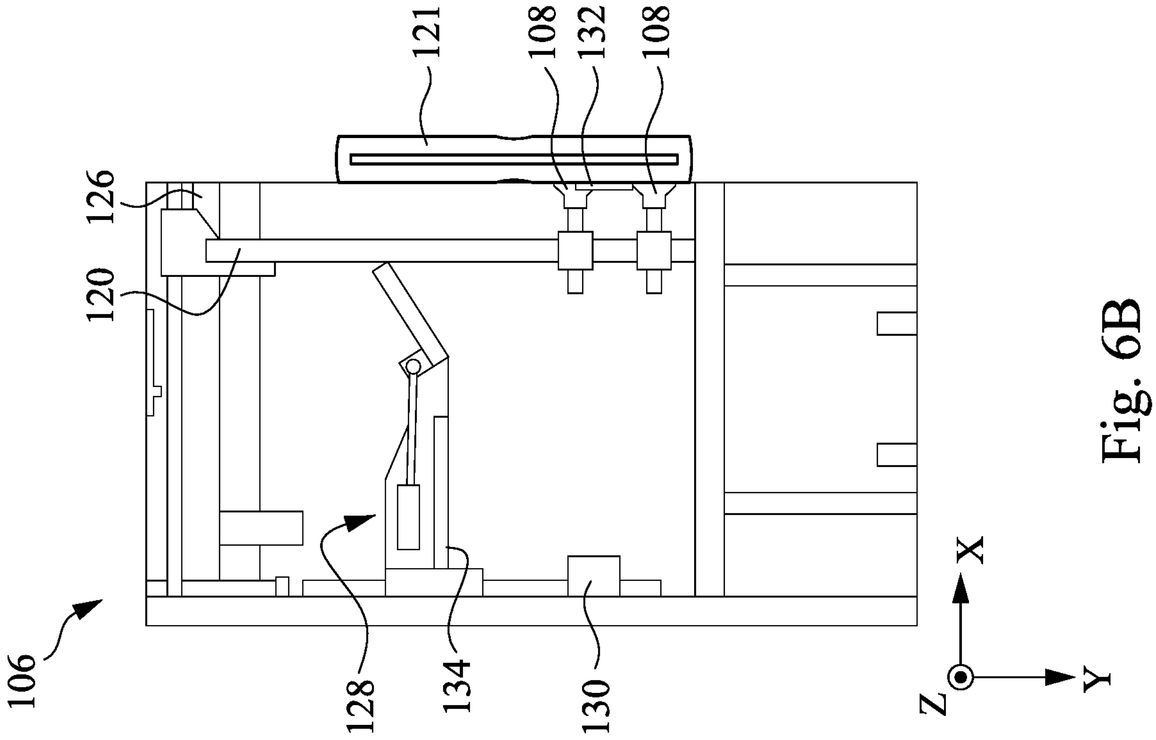
FIG. 6B is a top view of the expanding apparatus of the box erecting machine of FIG. 1 with a pick apparatus advanced to pick the flat box blank, in accordance with some embodiments.
Figure 6A:
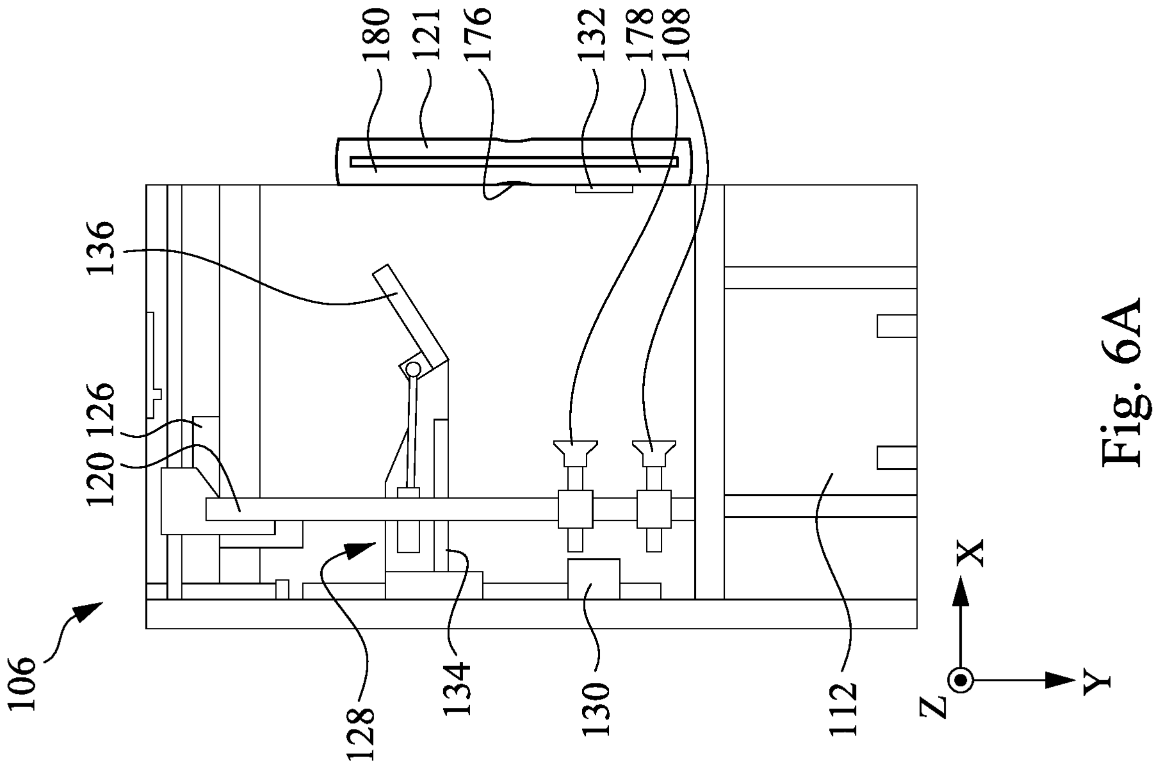
FIG. 6A is a top view of an expanding apparatus of the box erecting machine of FIG. 1, prior to erecting a box, in accordance with some embodiments.

FIGS. 6A-6F show the operation of the expanding apparatus 106. FIG. 6A is an initial position of elements of the expanding apparatus 106, including the arm assembly 128, the vacuum suction cups 108, and the camera 130. Movement of the elements of the expanding apparatus 106 is regulated, or controlled, by the machine controller 113 according to parameters an operator provides using the machine operator interface 115 (FIG. 1). The operator may provide parameters, examples of which may include a box type, a box width, and an expected score line distance 192. Alternatively, these parameters may be stored in the machine controller 113 associated with a box type such that the associated parameters can be automatically accessed once the operator enters the box type. After the operator has loaded the box blanks 104 in the box blank cartridge 102 and moved the cartridge follower 114 into position resting against the last box blank 119, the gate latch 132 prevents the first box blank 121 from entering the expanding apparatus 106. Upon the operator starting the box erecting machine 100, the machine controller 113 moves the gantry 120 and vacuum suction cups 108 toward the box blanks 104.

The machine controller 113 adjusts a position of the vacuum suction cups 108 in the Y direction such that the vacuum suction cups 108 contact a panel of the first box blank. The arm assembly 128 is positioned in the Y axis such that the folding arm 136 will make contact with a panel of the box blank while the blank is being expanded and the push arm 134 of the arm assembly 128 allows room for the expanded box. The camera 130 is positioned in the Y axis so as to allow a field of view of the folding score line 176 of the box blank which faces toward the camera 130.

FIG. 6B shows the expanding apparatus 106 after the machine controller 113 has moved the vacuum suction cups 108 into contact with the box blank. Once the vacuum suction cups 108 are in contact with the box blank, a vacuum is applied to the vacuum suction cups 108 and atmospheric pressure pushes the box blank against the vacuum suction cups 108. The gate latch 132 may be momentarily released by the machine controller 113, releasing the box blank from the box blank cartridge 102 and allowing the vacuum suction cups 108 to move the box blank into the expanding apparatus 106 as the gantry 120 moves backward away from the box blank cartridge 102.

Figure 6D:
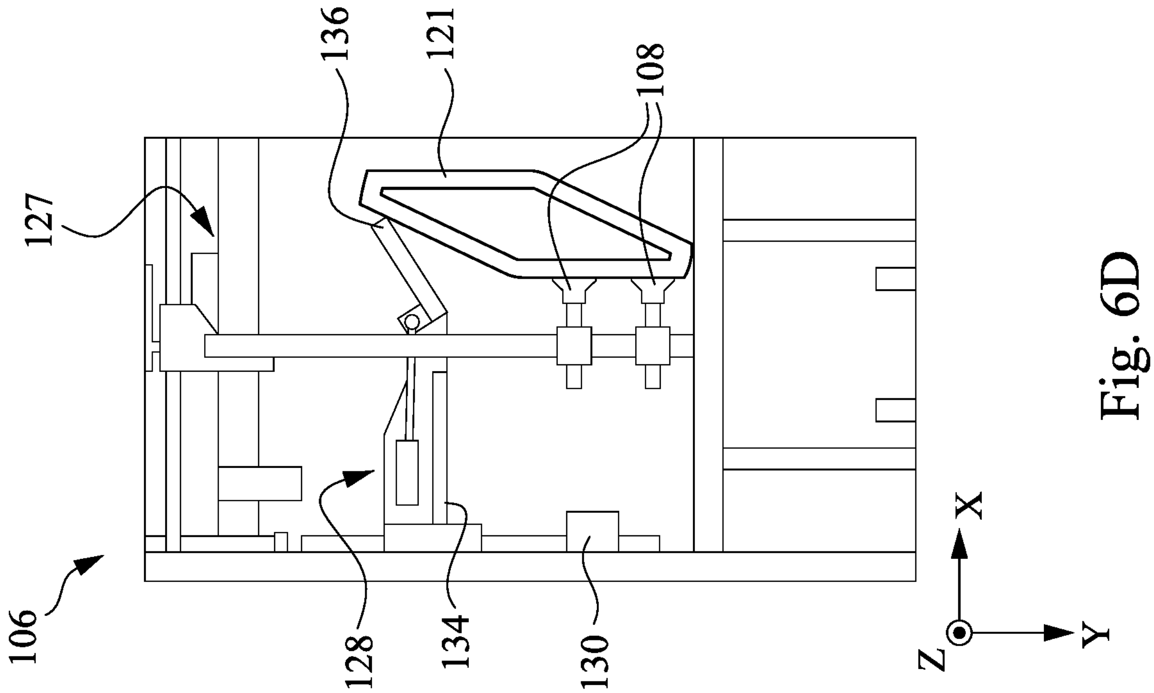
FIG. 6D is a top view of the expanding apparatus of the box erecting machine of FIG. 1 with a box partially erected from the box blank, in accordance with some embodiments.
Figure 6C:
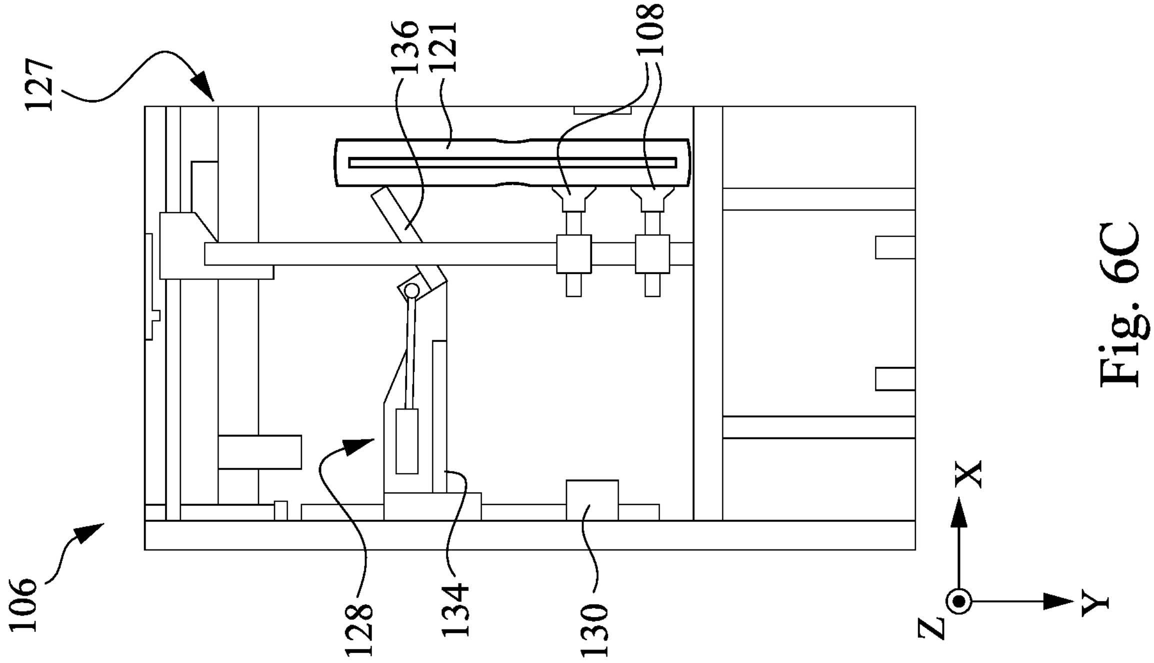
FIG. 6C is a top view of the expanding apparatus of the box erecting machine of FIG. 1 with a folding arm contacting the box blank, in accordance with some embodiments.

FIG. 6C shows the expanding apparatus 106 while the machine controller 113 is moving the box blank toward the folding arm 136. When a panel of the box blank contacts the folding arm 136, the box blank bends along the vertical score lines of the box blank and the box blank begins to expand.

FIG. 6D shows the expanding apparatus 106 while the box blank 121 is partially expanded. The vacuum suction cups 108 continue to move in the negative X direction moving the box blank 121 against the folding arm 136, causing the box blank.

Figure 6F:
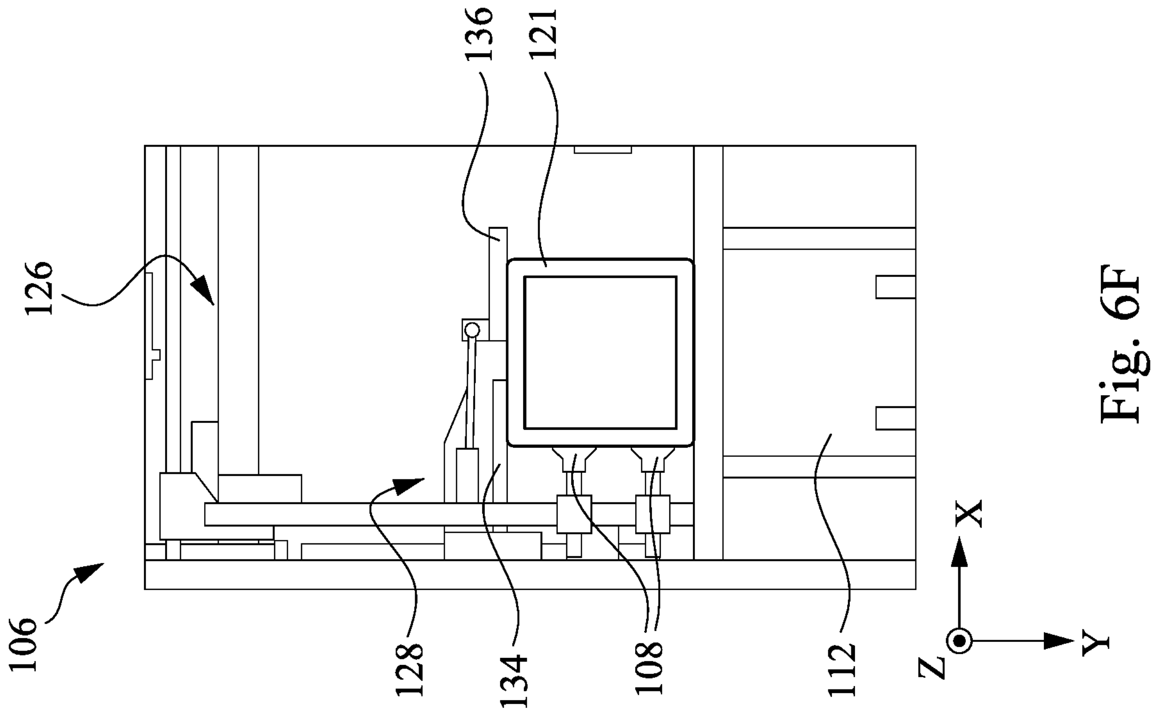
FIG. 6F is a top view of the expanding apparatus of the box erecting machine of FIG. 1 with the box ready to be pushed onto an exit conveyor, in accordance with some embodiments.
Figure 6E:
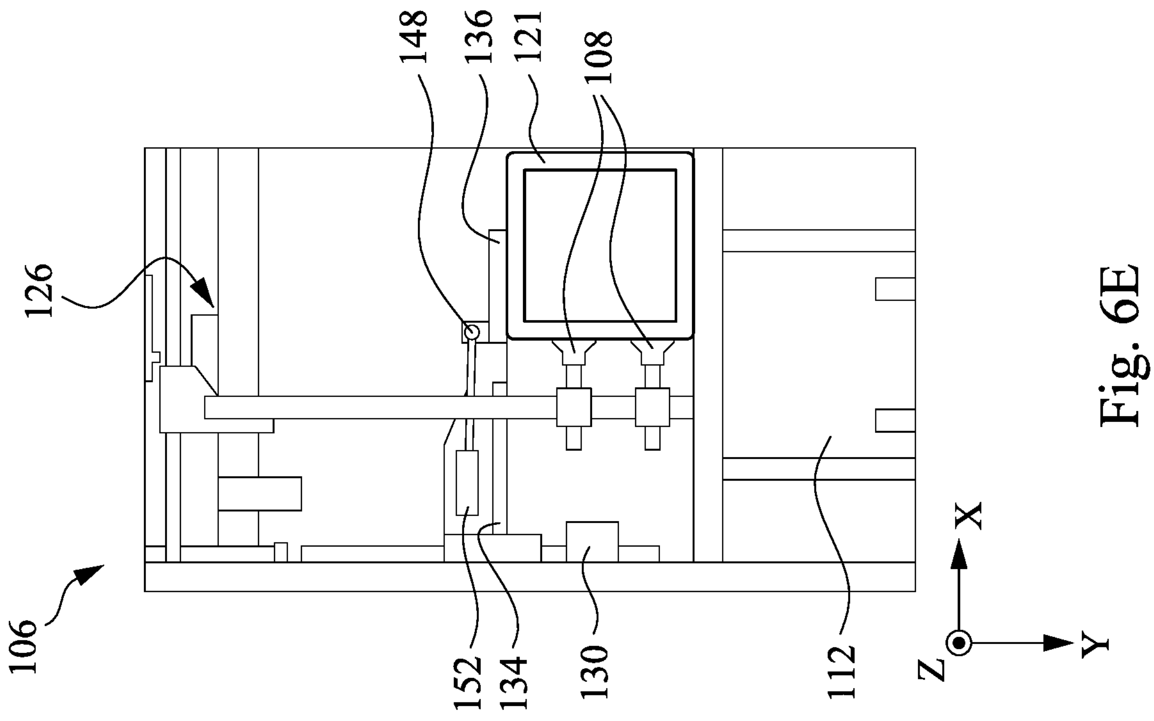
FIG. 6E is a top view of the expanding apparatus of the box erecting machine of FIG. 1 with the box erected, in accordance with some embodiments.

FIG. 6E shows the vacuum suction cups 108 moving the box blank 121 further in the negative X direction, the cylinder 152 pushing the drive extension 148 which rotates to folding arm 136 against the box blank 121, aiding in the expansion of box blank 121 into the box 121. A position of the folding arm 136 may be in parallel with the push arm 134 after rotation of the folding arm 136. Bottom flaps of the box may have been folded and sealed using known techniques.

FIG. 6F shows the box 121 in position to be pushed toward the exit conveyor. A side, or panel, of box 121 may be in contact with push arm 134. Depending on the size of the box, the side of box 121, in contact with the side of box 121, may also be in contact with the folding arm 136. The folding arm 136 which may be parallel with the push arm 134, thereby able to assist pushing box 121 toward the exit conveyor (see FIG. 6H).

Figure 6H:
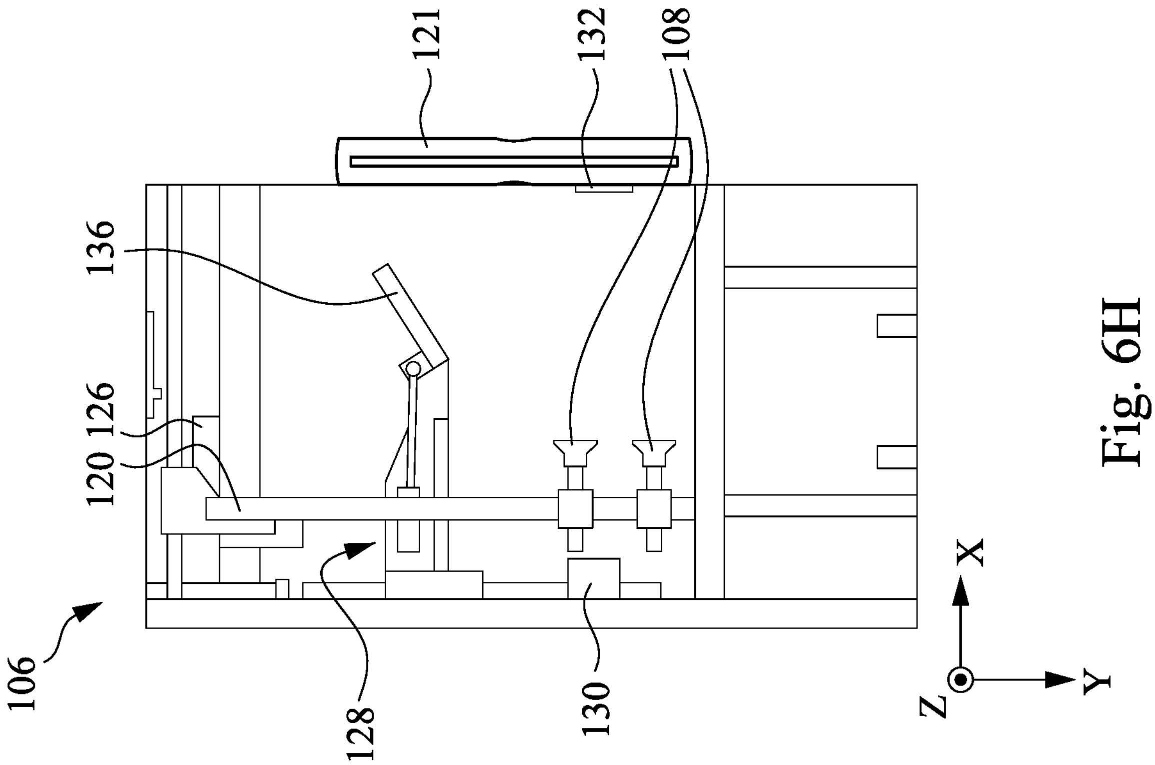
FIG. 6H is a top view of the expanding apparatus of the box erecting machine of FIG. 1 with the arm assembly in position to expand the next box blank.
Figure 6G:
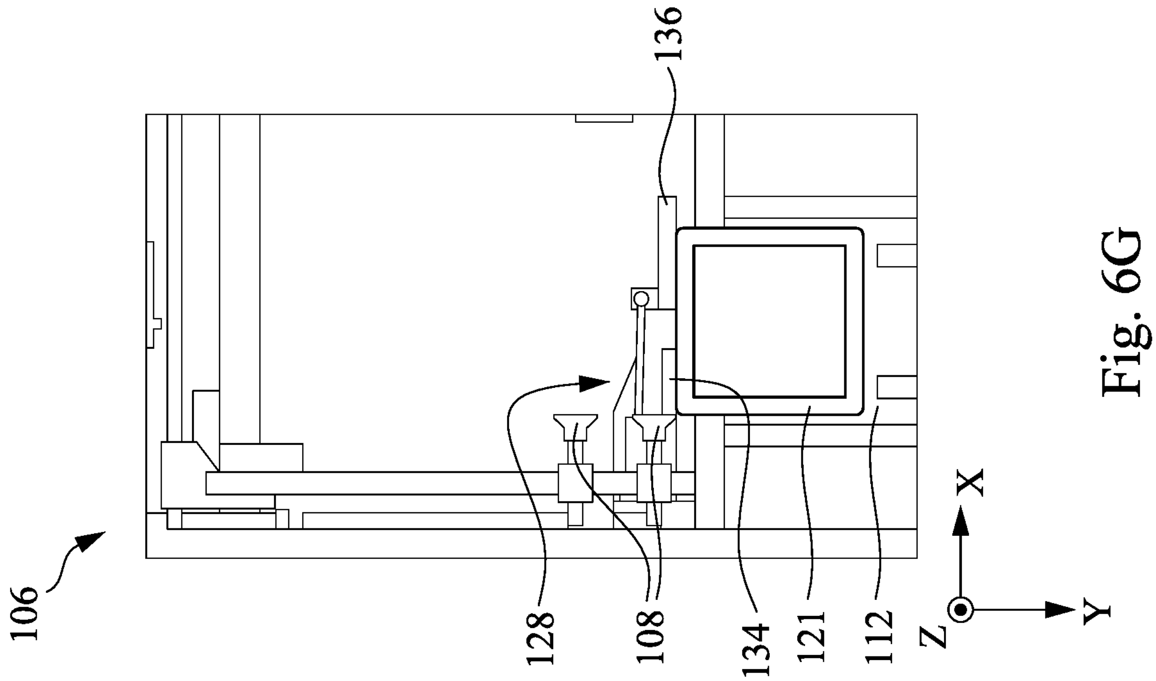
FIG. 6G is a top view of the expanding apparatus of the box erecting machine of FIG. 1 with the box being pushed onto the exit conveyor, in accordance with some embodiments.

FIG. 6H shows the expanding apparatus 106 as the box moves toward the exit conveyor 112. Vacuum has been removed from the vacuum suction cups 108 equalizing the atmospheric forces on the box panel and the box is free to move independent of the vacuum suction cups 108. The push arm 134 of the arm assembly 128 pushes the box toward the exit conveyor 112 as the arm assembly 128 along the +Y direction.

Figures 7A, 7B, 7C, 7D:
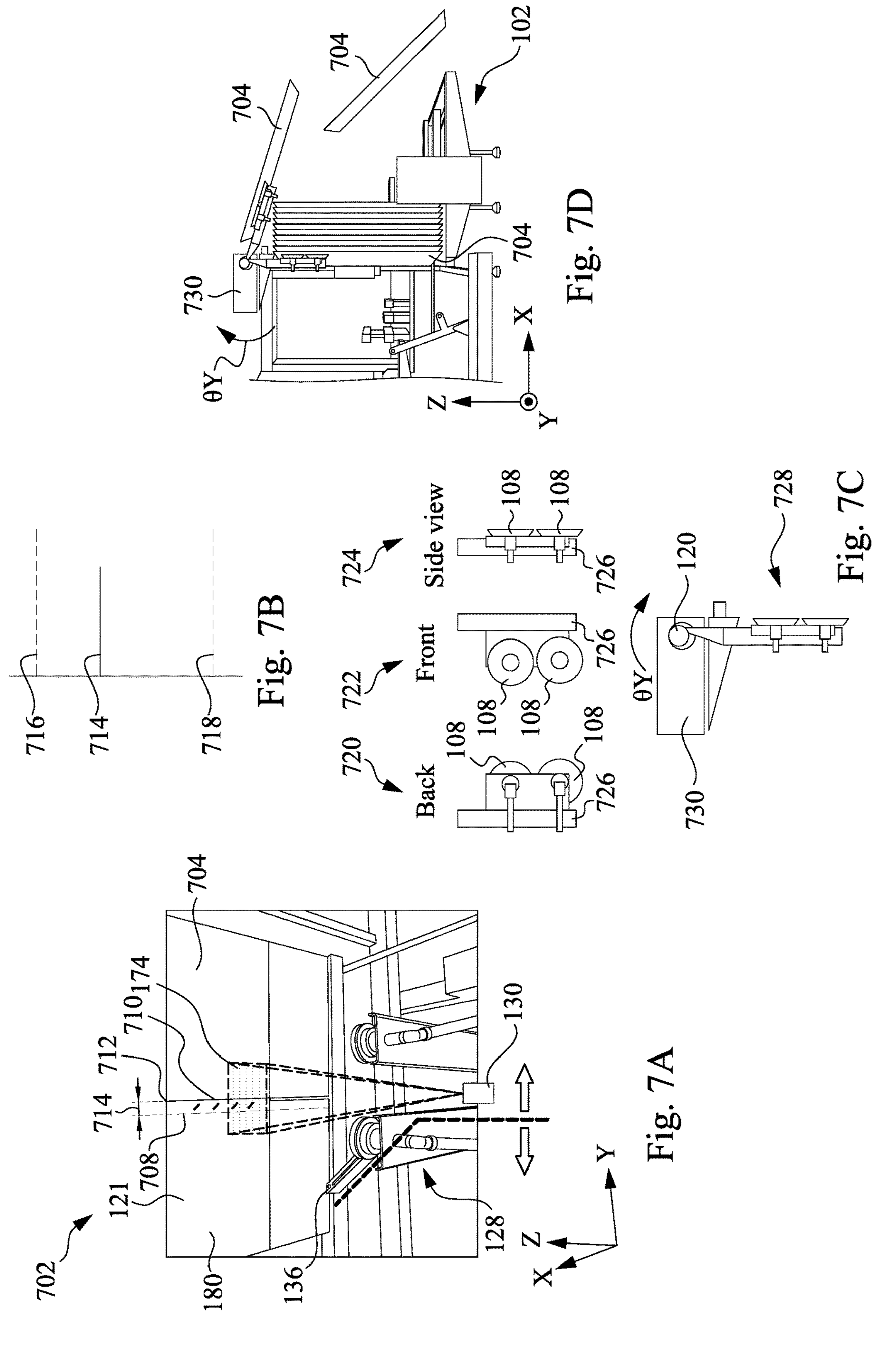
FIG. 7A is a perspective view of the expanding apparatus of FIGS. 6A-6F, in accordance with some embodiments.
FIG. 7B illustrates comparison of score line offset to score line offset thresholds in accordance with some embodiments.
FIG. 7C is a side view of vacuum suction cups of the expanding apparatus of FIGS. 6A-6F, in accordance with some embodiments.
FIG. 7D is a side view of the expanding apparatus of FIGS. 6A-6F, showing rejection of a flat box blank, in accordance with some embodiments.

An advantage of using the camera 130 includes the ability to reject a box blank for reasons such as incorrect size, improper position or a box blank defect. FIGS. 7A-7D show an example of rejecting a box blank in accordance with some of the disclosed embodiments. FIG. 7A is a perspective view 702 looking into the expanding apparatus 106. A box blank 704 is in a position to be pulled into the expanding apparatus 106 from the box blank cartridge 102 (see FIG. 1). A field of view 706 of camera 130 is shown and includes an expected or standard position 708 of a score line 710 and an actual position 712 of the score line 710. A score line offset 706, or a distance between the standard position 708 and the actual position 712 of the score line 710 may be determined by the machine controller 113 using the camera 130 as described above or may be determined by the camera 130 itself.

Referring now also to FIG. 7B, in accordance with the present embodiment, machine controller 113 compares a score line offset 714 to a first or high score line offset threshold 716. The score line offset 714 being greater than the high score line offset threshold 716 may trigger an error condition. In accordance with the present embodiment, machine controller 113 compares the score line offset 714 to a second or low score line offset threshold 718. The score line offset 714 being less than the score line offset threshold 716 may trigger an error condition. The error condition may indicate box blank 704 does not match a type of the box blank entered by the operator using the operator interface 115. Other conditions that may indicate an error condition include examples such as an incorrectly loaded box blank, a box blank skewed in the carriage, the last box blank has been expanded and the carriage is empty or a damaged box blank. The high and low score line offset thresholds 716 and 718 may be centered around zero or have other values as needed.

Actions may be taken when the score line offset 714 exceeds a threshold. In an alternative embodiment, FIG. 7C shows a back view 720, a front view 722 and a side view 724 of a set of two vacuum suction cups 108 coupled to a bracket 726 forming components of a box blank rejection mechanism. In side view 728, the bracket 726 is coupled to a gantry 120 using a rotor 730 controlled by the machine controller 113, that allows the bracket and vacuum suction cups 108 to rotate in a degree of freedom such as $\Phi_Y$. When the machine controller 113 determines the score line offset 714 exceeds an offset threshold, a box blank rejection action such as that shown in FIG. 7D may occur. In operation, the vacuum suction cups 108 advance toward the box blank 704, the box blank 704 is pushed against the vacuum suction cups 108 by atmospheric pressure when vacuum is applied to the vacuum suction cups, the gate latch 132 momentarily releases and allows the box blank 704 into the expanding apparatus 106, the rotor 730 rotates the vacuum suction cups 108 and the box blank 704 over a top of the box blank cartridge 102 of the box expanding machine 100 and releases the box blank 704 over the box blank cartridge 102. The box erecting machine 100 then proceeds to a next box blank.

Figure 8:
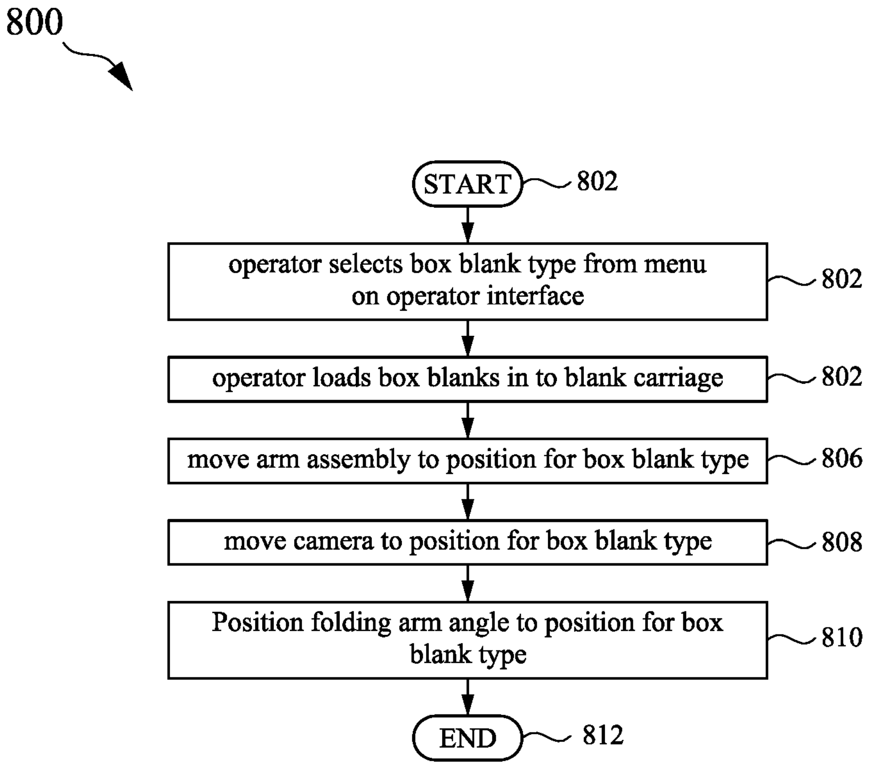
FIG. 8 is a flow chart of a setup procedure for the box erecting machine of FIG. 1 for operation, in accordance with some embodiments.

FIG. 8 is a flow chart showing a setup operation of the box erecting machine 100 according to an embodiment of the present disclosure. The setup operation begins at a step 802. In a step 804 an operator selects a box blank type from a menu on an operator interface 115 of a machine controller 113. The machine controller 113 associates stored parameters specific to the box blank type such as a box blank width, a score line position relative to an edge of the box blank, and an offset threshold. For instance, based on the blank width, the machine controller 113, or operator, may adjust a right box blank guide 116 of the box blank cartridge 102 to accommodate the box blank width. In step 804, the operator pulls a cartridge follower 114 back and loads the box blanks 104 into the box blank cartridge 102 such that a score line between box panels is vertical and an edge of the box blank is against the left box blank guide 118. The cartridge follower 114 is then moved to come into contact with a last box blank 119 in the box blank cartridge 102. A first box blank 121 is up against a gate latch 132, which prevents the first box blank 121 from entering an expanding apparatus 106. In step 806, the operator indicates to the machine controller 113 that the box blanks 104 are loaded, and the controller moves an arm assembly 128 to a position along an arm linear track 160 parallel to a Y axis. The position of the arm assembly 128 may be a parameter associated with the box blank type as accessed by the machine controller 113, referred to as an arm assembly 128 initial position. The arm assembly 128 initial position may be such that a front face of a push arm 134 is aligned with an average, or typical, position of a score line between two panels of the box blanks 104 in the box blank cartridge 102. Other arm assembly 128 initial positions may be used as determined to be needed for box expansion. In step 808, the operator aligns a camera 130 to a position in which the camera field of view includes the score line between two panels of the first box blank 121. The machine controller 113 may examine an image from the camera to aid the operator in the alignment of the camera 130 using, for example, an audible sound from the operator interface 115. Alternatively, the camera 130 may ride on an arm linear track 160 parallel to the Y axis having a position encoder, and the machine controller 113 may automatically position the camera 130 along the linear track using a camera 130 position actuator based on a position parameter associated with the box blank type. The camera 130 position may be such that a distance between a reference point 182 in the camera field of view 174 and the score line 176 of the box blank is an average offset 186 for the box blank type. In step 810, the machine controller 113 uses the pneumatic actuator of the arm assembly 128 to adjust an angle between a front face of a folding arm 136 and a front face of the push arm 134 to a value of a stored folding arm angle parameter specific to the box type. The setup operation of the box erector machine ends with step 812.

Figure 9:
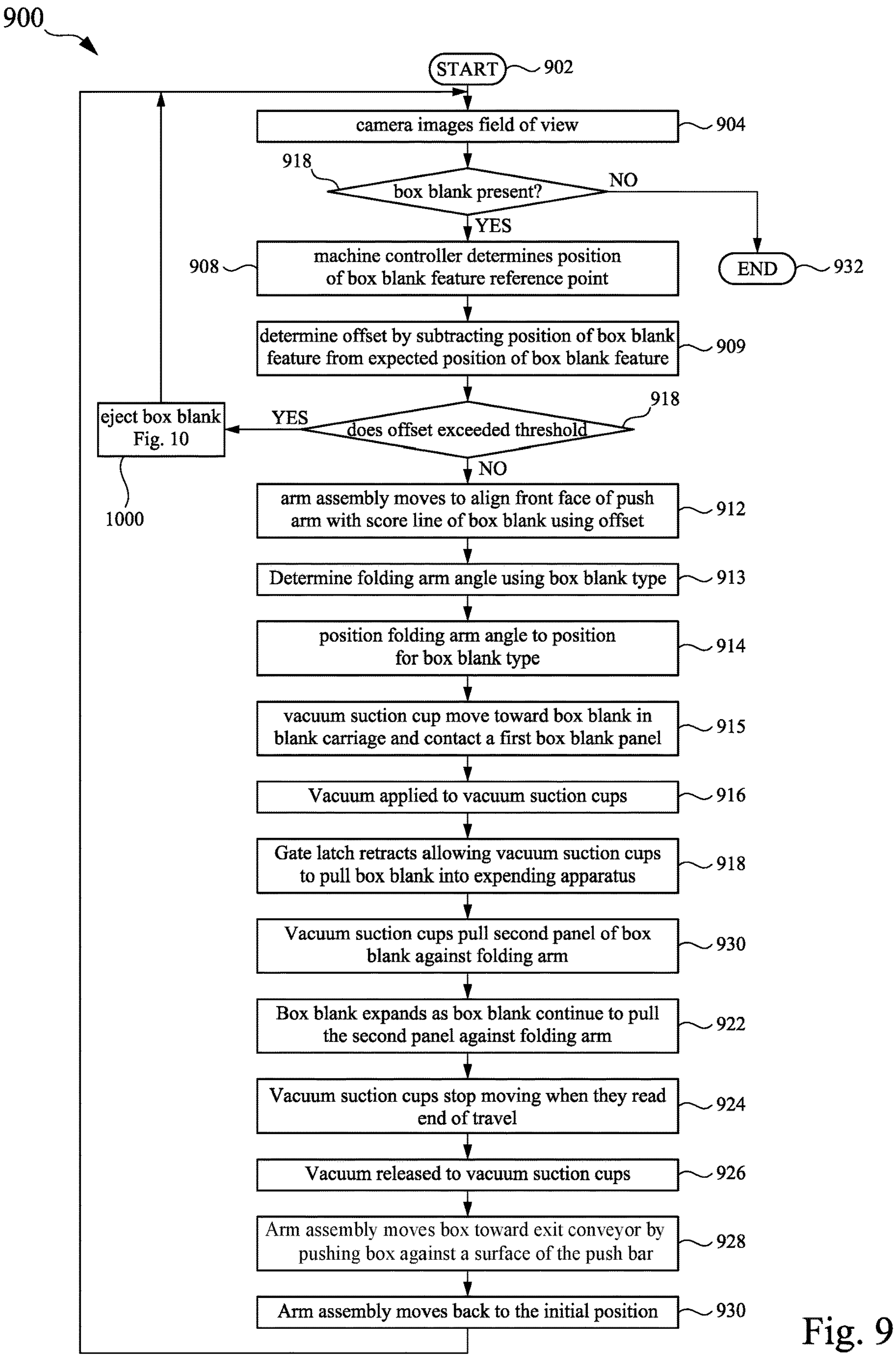
FIG. 9 is a flow chart of operation of the box erecting machine of FIG. 1, in accordance with some embodiments.

FIG. 9 is a flow chart 900 including steps for erecting a box from a box blank after the setup operation 800 is performed. The box erecting process starts at step 902. In step 904, the camera images a field of view that is intended to include a box blank feature, such as a score line between a first and second panel of a next box blank in the box blank cartridge 102. Other box blank features may include a mark, a line or a pattern printed on the box. The image is electronically transmitted from the camera 130 to the machine controller 113. The machine controller 113 first examines the image to determine if the next box blank is present in decision 906. If the next box blank is present (yes) then the box erecting procedure 900 goes to step 908, in which the machine controller 113 determines an actual distance between the score line and a reference point and a score line for the next box blank. The distance between the reference point and a score line may be an actual position of the score line referenced to the reference point in the image. Proceeding to step 909, an offset may be determined by subtracting the distance between the score line and the reference point from an expected distance between the scoreline and the reference point. Alternatively, the offset may be determined by using the reference point and the expected distance between the score line and the reference point to determine an expected position of the score line, from which the actual position of the score is be subtracted.

The box erecting process proceeds to a decision step 910, to determine whether the score line offset 194 exceeds an offset threshold. Examples of the offset threshold may include a simple plus and minus offset threshold or a more complex offset threshold such as a plus offset threshold and a minus offset threshold which have non-equal magnitudes. Examples of situations in which the score line offset 194 may exceed the offset threshold include the next box blank being the wrong size, or the wrong box blank type. Alternatively, the machine controller 113 may use a reference line 184, such as an edge of the image and determine if any one or more points along the score line exceed an offset threshold. Examples of a situation in which the score line offset 194 may exceed an offset threshold along the score line may include a box blank that is at an angle, or improperly loaded, into the box blank cartridge 102. If an answer to the decision "Does the score line offset 194 exceed the offset threshold" is "Yes" then the process proceeds to step 1000, which is detailed in FIG. 10, and the box blank is ejected. Alternatively, operation of the box erecting machine 100 may stop and alert the operator to the error. After the box blank is ejected, then the box erecting process proceeds back to step 904. If the answer to decision step 910 "Does the score line offset 194 exceed the offset threshold" is "No" then the process 900 proceeds to step 912. In step 912, the arm assembly 128 moves to align a front face of the push arm 134 of the arm assembly 128 with the score line of the next box blank using the score line offset 194 determined in step 908. For example, if the score line offset 194 of a box blank is 1 inch to the right of the average score line offset 194, then the arm assembly 128 may move 1 inch to the right from the arm assembly 128 initial position.

After step 912, the process 900 moves to step 913 in which the controller determines a folding arm angle associated with the box blank type being expanded. In step 914 the controller positions, or rotates, the folding arm to the determined folding arm angle. The process 900 may move to step 915, in which a gantry 120 moves toward the box blank cartridge 102, moving vacuum suction cups 108 toward the next box blank until the vacuum suction cups 108 contact the first panel of the next box blank. Next, in step 916, vacuum is applied to the vacuum suction cups 108, and atmospheric pressure presses the next box blank against the vacuum suction cups 108 allowing the vacuum suction cups 108 to exert force onto the first panel of the next box blank. In step 918, the gate latch 132 momentarily retracts allowing the next box blank to be pulled into the expanding apparatus 106 by the vacuum suction cups 108 and the gantry 120. In step 920, as the vacuum suction cups 108 are pulling the next box blank into the expanding apparatus 106, the second panel of the box blank contacts the folding arm 136 and the box blank bends at score lines and the box begins to expand or open. In step 922, the box blank continues to expand as the second panel of the box blank is pulled against the folding arm 136. In an embodiment, the folding arm angle, or the angle of the folding arm 136 to the push arm 134, may stay constant during the expanding process. Alternatively, the linear actuator 150 of the arm assembly 128 may extend the drive extension 148 to reduce the folding arm 136 angle, aiding in the folding at the score line between the first and second panel of the box blank.

In step 924, the box blank stop moving the box blank at some time after the box has expanded and in step 926 the vacuum is released from the vacuum suction cups 108, releasing the box from the vacuum suction cups 108. In step 928 the arm assembly 128 moves the box toward the exit conveyor 112 by pushing the box against a surface of the push bar. After the box is pushed out of the expanding apparatus 106, in step 930 the arm assembly 128 may return to its initial position along the arm linear track 160 and the box expanding process returns to step 904, in which the camera 130 images the field of view.

Returning to decision step 906, if the answer to the question "Next box blank is present?" is "No" then the box expanding process 900 ends at step 932.

Figure 10:
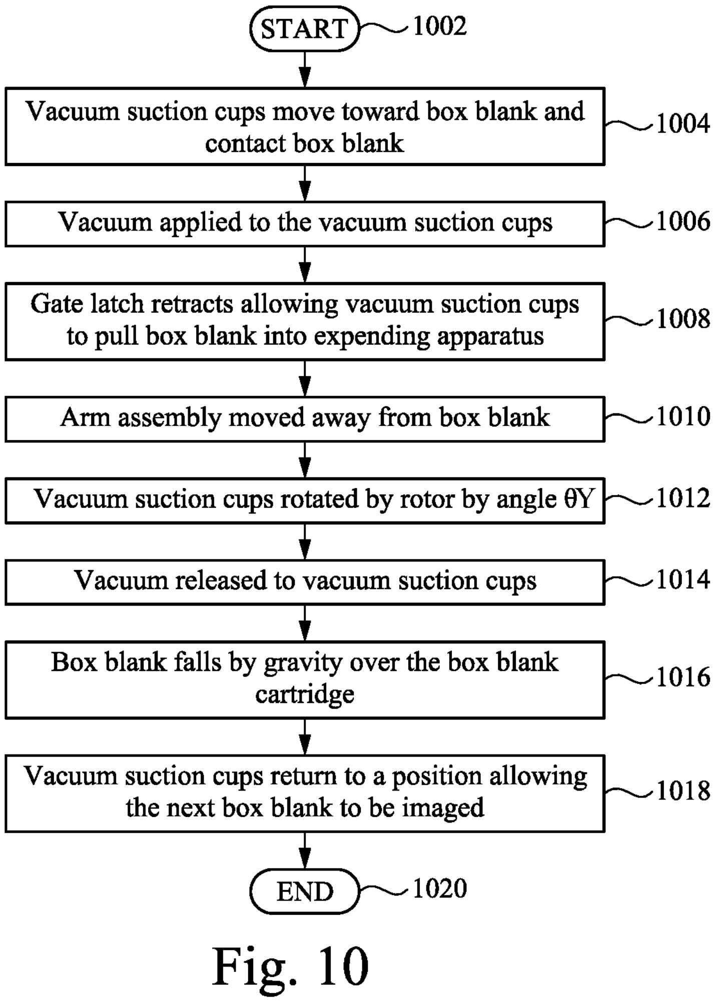
FIG. 10 is a flow chart of operation of a box ejection procedure for the box erecting machine of FIG. 1, in accordance with some embodiments.

FIG. 10 shows the box blank ejection process 1000 being initiated at step 1002. In step 1004, the gantry 120 moves the vacuum suction cups 108 toward the next box blank and contacts the next box blank. In step 1006, vacuum is applied to the vacuum suction cups 108, and atmospheric pressure pushes the next box blank 121 against the vacuum suction cups 108. Next, in step 1008, the gate latch 132 momentarily retracts allowing the vacuum suction cups 108 to pull the next box blank 121 into the expanding apparatus 106. In step 1010, the arm assembly 128 moves on the arm linear track 160 away from the box blank 121 to ensure the folding arm 136 does not contact the box blank 121. Process 900 moves to step 1012 in which the vacuum suction cups 108 are rotated by rotor 730 (see FIG. 7C) by an angle $\Phi_Y$, lifting the box blank and clearing the box blanks 104 in the box blank cartridge 102. In step 1014, the controller 113 releases the vacuum from the vacuum suction cups 108. In step 1016 gravity causes the box blank to fall over the box blank cartridge. Alternatively, the gantry may move the box blank toward the blank cartridge while the vacuum is released, giving the box blank some momentum to clear the box blank cartridge. In step 1118, the vacuum suction cups are rotated by the rotor 730 by an angle which may be the negative of $\Phi_Y$, the gantry 120 and vacuum suction cups 108 returning to a position, preferably out of the camera field of view 174, and the box blank ejection process 1000 ends at step 1020.

Alternate methods of ejecting a box blank may be used, including notifying an operator that a box blank needs to be removed from the expanding apparatus 106 or rotating the vacuum suction cups by an angle such that the box blank is ejected out an alternate side of the box erecting machine 100.

Embodiments in accordance with the present disclosure include an apparatus for expanding a box blank. Some described embodiments include an arm assembly, a controller and a box blank conveyor. The arm assembly includes a base having a surface, a first arm coupled to the surface of the base through a rotation joint, the first arm having a surface perpendicular to the surface of the base, and an actuator. The actuator includes a body, coupled to the surface of the base, and an actuator arm coupled to the first arm, a position of the actuator arm determining a rotation angle of the first arm around the rotation joint. The controller is coupled to the actuator of the arm assembly. The apparatus includes a box blank conveyor, which, in operation, moves the box blank against the surface of the first arm of the arm assembly, expanding the box blank. A controller is present which, in operation, sets the rotation angle of the first arm around the rotation joint based on a first dimension of the box blank.

In other embodiments, the present disclosure includes an apparatus, including a controller, a push extension a folding extension, a box blank conveyor and a camera. The push extension, in operation, is positioned by the controller in a first direction. The folding extension is rotationally coupled to the push extension. The folding extension, in operation, forms an angle with the push extension, the angle determined by the controller. The apparatus also includes a box blank conveyor, coupled to the controller, which, in operation, moves a box blank in a second direction different from the first direction to contact the folding extension. The apparatus also includes a camera electronically coupled to the controller, the camera having a field of view during operation which includes a feature of the box blank, a position of the feature in the field of view being determined by the camera or the controller. The controller, in operation, uses the position of the feature in the field of view to position the push extension in the first direction, such that, in operation, the box blank conveyor moves the box blank in the second direction to contact the folding extension and cause the box blank to expand.

Other embodiments of the present disclosure, relate to methods for expanding a box blank, including imaging a box blank using a camera having a field of view including a feature of the box blank to generate an image of the field of view. The methods include determining a position of the feature of the box blank using the image of the field of view. The method includes moving a folding arm in a first direction to align the folding arm with a panel of the box blank using the position of the feature of the box blank. The method determines a folding arm angle using the position of the feature of the box blank and rotates the folding arm to the folding arm angle by a folding arm actuator coupled to the controller. The method also includes moving the box blank in a second direction, different from the first direction, by a box blank conveyor to contact the folding arm.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for expanding a box blank, comprising:
- an arm assembly, including:
  - a base having a surface;
  - a first arm coupled to the surface of the base through a rotation joint, the first arm having a box blank contact surface perpendicular to the surface of the base; and
  - an actuator, including:
    - a body, coupled to the surface of the base; and
    - an actuator arm coupled to the first arm;
- a box blank conveyor, which, in operation, moves the box blank against the box blank contact surface of the first arm of the arm assembly, expanding the box blank, the box blank conveyer including:
  - a vacuum cup;
  - a valve to selectively couple the vacuum cup to a vacuum;
  - a positioner coupled to the vacuum cup; and
  - a controller coupled to the positioner and the valve, the controller, in operation, causes the positioner to move the vacuum cup against the box blank, opens the valve to couple the vacuum to the vacuum cup, and causes the box blank to move in a second direction against the box blank contact surface of the first arm;
- a camera having a field of view including a feature of the box blank;
- a controller electrically coupled to the camera, the controller in operation, receives an image from the camera, determines a position of the feature of the box blank in the field of view and moves the arm assembly in a first direction using the actuator based on the position of the feature in the field of view.

2. The apparatus of claim 1, further comprising: a first linear actuator coupled to the arm assembly, the controller, in operation, causes the linear actuator to move the arm assembly in a second direction.

3. The apparatus of claim 2, wherein the first direction is transverse to the second direction.

4. The apparatus of claim 3, wherein the first linear actuator coupled to the arm assembly includes:

a linear track; and a positioner coupled between the linear track and base of the arm assembly.

5. The apparatus of claim 1, wherein a feature of the box blank includes a score line of the box blank and the position of the feature is relative to a reference point.

6. The apparatus of claim 1, wherein the controller electrically coupled to the camera, in operation, upon receiving the image from the camera and determining the position of the feature of the box blank in the field of view, rotates the first arm of the arm assembly to a rotation angle based on the position of the feature of the box blank in the field of view.

7. An apparatus, comprising:

a controller;

a push extension positionable, by the controller during operation, in a first direction;

a folding extension positionable, by the controller, during operation, the folding extension in operation forming an angle with the push extension the angle determinable by the controller;

a box blank conveyor, which in operation moves a box blank including a feature in a second direction different from the first direction to contact the folding extension;

a first linear actuator coupled to the push extension; and the controller, in operation, uses a position of the feature to position the push extension in the first direction, sets a rotation angle of the folding extension around a rotation joint based on the position of the feature, such that, in operation, the box blank conveyor moves the box blank in the second direction to contact the folding extension and cause the box blank to expand.

8. The apparatus of claim 7, further comprising:

a base coupled between the push extension and the folding extension and the rotation joint coupled between the base and the folding extension, which allows the folding extension to rotate; and an actuator coupled to the folding extension, the actuator having a position determined by the controller, which, in operation, uses the position of the feature to determine the position of the actuator.

9. The apparatus of claim 8, the actuator being a linear actuator coupled between the base and the folding extension.

10. The apparatus of claim 9, the folding extension including a drive extension, the drive extension coupled between the linear actuator and the folding extension.

11. The apparatus of claim 7, the box blank conveyor including:

a vacuum suction cup, selectively coupled to a vacuum;

an actuator, which, in operation, positions the vacuum suction cup in the second direction; and a bracket coupled between the actuator and the vacuum suction cup.

12. The apparatus of claim 7, further comprising a box blank rejection mechanism.

13. The apparatus of claim 7, further comprising a camera electronically coupled to the controller, the camera having a field of view, which, during operation, includes the feature of the box blank, the position of the feature in the field of view being determined by the camera or the controller.

14. The apparatus of claim 13, wherein the feature of the box blank in the field of view is a score line.

15. A method for expanding a box blank, including:

determining a position of a feature of the box blank;

moving a folding arm in a first direction to align the folding arm with a panel of the box blank using the position of the feature of the box blank;

determining a folding arm angle using the position of the feature of the box blank;

rotating the folding arm to the folding arm angle by a folding arm actuator; and moving the box blank in a second direction, different from the first direction causing the box blank to contact the folding arm.

16. The method of claim 15, further including:

rotating the folding arm toward the box blank by the folding arm actuator while the folding arm is in contact with the box blank.

17. The method of claim 15, further including:

rejecting the box blank by a box blank conveyor if an offset of the position of the feature of the box blank exceeds a threshold.

18. The method of claim 15, further including rejecting the box blank by lifting the box blank over a box blank cassette.

19. The method of claim 18, wherein rejecting the box blank by a box blank conveyer further includes contacting the box blank with a suction cup of the box blank conveyor.

20. The method of claim 15, wherein, the feature of the box blank is a score line.

* * * * *